Dec. 14, 1948.  N. M. SULLIVAN  2,456,224
OVERHEAD CONVEYER MECHANISM
Filed Sept. 20, 1945   2 Sheets-Sheet 1
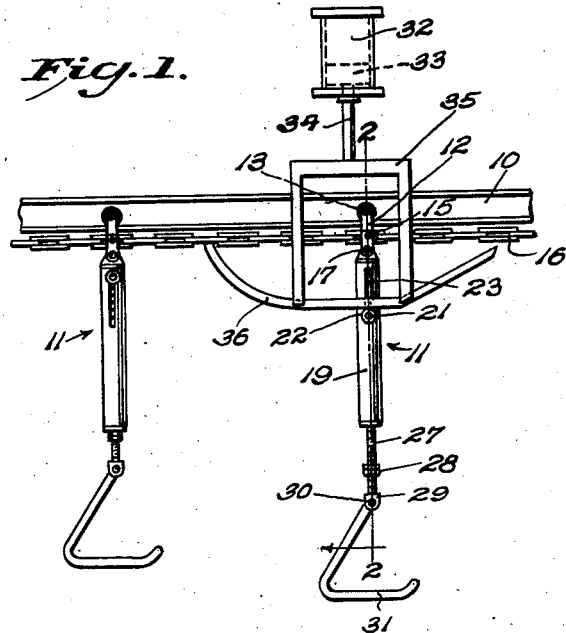
Fig. 1.
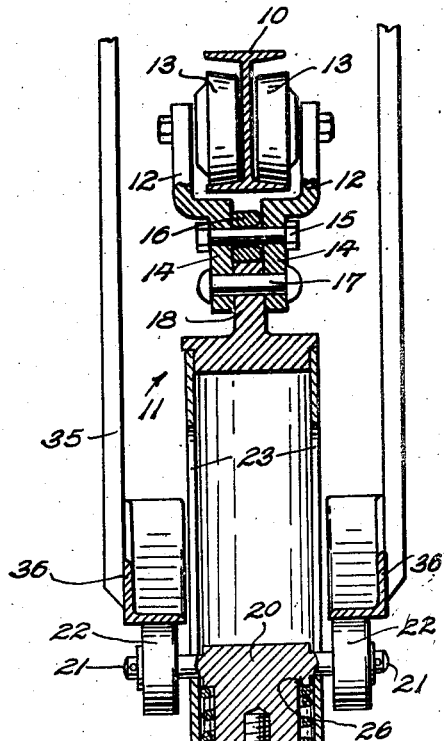
Fig. 2.
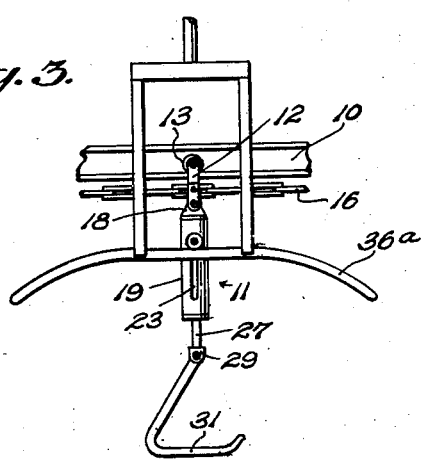
Fig. 3.
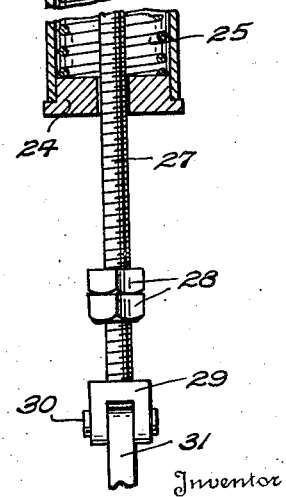
Inventor
Norman M. Sullivan
By
Attorney Inventor
Norman M. Sullivan Patented Dec. 14, 1948

2,456,224

UNITED STATES PATENT OFFICE 2,456,224

OVERHEAD CONVEYER MECHANISM

Norman M. Sullivan, Kent, Ohio

Application September 20, 1945, Serial No. 617,498

6 Claims. (Cl. 198—177)

This invention refers to conveyor construction and, more particularly, to conveyors of the roller type operating on overhead trackways for transporting commodities in industrial establishments or other locations from one zone or department of operation to another.

It is desirable in the installation of such conveyors to arrange the same in relatively elevated positions, so that the commodities carried thereby will interfere as little as possible with operations carried on beneath the same. However, due to their elevation, it is often difficult and awkward to remove or replace commodities on the carriers of such conveyors and considerable lifting and handling of the commodities are often necessitated.

Accordingly, it is an object of the present invention to provide an overhead conveyor with a plurality of load carriers which function normally to support commodities in relatively elevated positions of travel, but which, at convenient loading and unloading stations along the conveyor, may be automatically lowered with respect to their normal planes of travel, so that the products or goods supported by the conveyor, when such stations are reached, will be located within easy and convenient reach for removing, loading or other purposes.

Another object is to provide such a conveyor with means, under ready control of an operator, for operatively or inoperatively positioning the means for automatically lowering the load carriers at such loading or unloading stations, so that, if desired, the carriers may pass such stations without being actively operated to lower the products thereon.

In connection with the foregoing objects, I have developed a number of novel structural details and part arrangements, which will be readily understood by reference to the following description and the accompanying drawings, wherein:

Fig. 1 is a side elevational view of an overhead conveyor formed in accordance with the present invention;

Fig. 2 is a vertical transverse sectional view taken through the conveyor on the plane indicated by the line 2—2 of Fig. 1;

Fig. 3 is a fragmentary side elevational view of a modified form of my invention;

Figure 4:
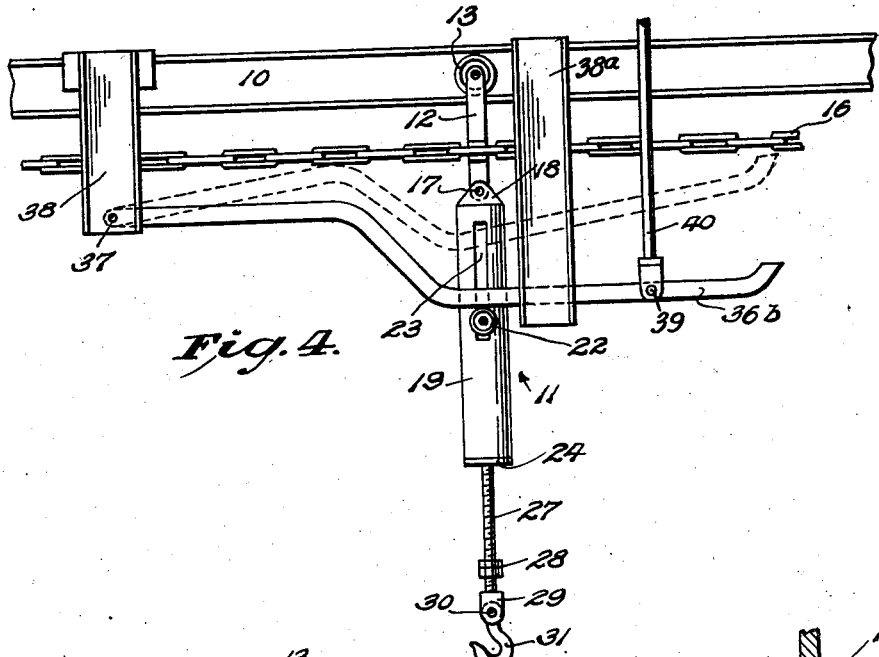
Fig. 4 is a similar view of a further modification.

Referring more particularly to the drawings, the numeral 10 designates an elevated track beam, which may be substantially I-shaped in cross section, the beam being stationarily supported by any suitable means in an overhead or elevated position. Movable longitudinally along the beam are a plurality of traveling load supports or carriers, which have been indicated in their entirety by the numeral 11. Each of these supports or carriers is formed to embody a trolley composed of a pair of arms indicated at 12. The upper ends of these arms are provided with stud axles for the rotatable reception of track-engaging rollers 13, the latter operating on the upper surfaces of the lower flanges of the beam 10, as shown in Fig. 2. The lower, inwardly offset ends 14 of the arms 12 are apertured for the reception of a cross bolt 15, said bolt extending through the associated link of a movable operating chain 16, by means of which the load carriers are advanced along the track beam. Any suitable means may be employed for imparting power to said chain.

Also, the spaced lower ends of the arms 12 are additionally apertured to receive cross pins or rivets 17, the latter passing through an aperture provided in an upstanding arm 18 of a vertically disposed cylinder 19. Slidably mounted in the cylinder 19 is a cross head 20, the latter being provided with outwardly directed axle extensions 21 which effect the rotatable support of rollers 22, the extensions 21 being slidable in elongated vertical slots 23 formed in the side walls of the cylinder 19. The lower end of each of the cylinders 19 is provided with a closure member 24 which constitutes a seat upon which rests the lower end of a coil spring 25, the latter being confined within the cylinder 19. The upper end of the spring 25 engages with an annular shoulder 26 formed on the cross head 20, the spring 25 serving thereby to maintain the cross head in an elevated position within said cylinder.

Threadedly connected with the cross head 20 is a depending load carrying rod 27, the intermediate portion of the latter being slidably received in an axle opening provided in the closure 24. The rod projects beneath the cylinder 19 and is provided with stop nuts 28 which, through engagement with the lower surface of the closure 24, regulate the expansion of the spring 25 and the consequent extent of elevation of the cross head 20. The lower end of the rod 27 terminates in a clevis 29, and to which is pivotally connected as at 30 a load-carrying hook 31, the latter being adapted to receive commodities or products to be transported by the conveyor.

Through the action of the spring 25, the hook 31 of each load carrier is maintained in a normal elevated position, as shown at the left of Fig. 1, and in which position a commodity supported on the hook will be sufficiently elevated so as to avoid interference with activities taking place or devices disposed beneath the conveyor. However, when it is desired to reach such commodities in a convenient and ready manner, the present invention provides means for compressing the cross head 20 against the resistance offered by the spring 25, so that the operating positions of the hook 31 may be sufficiently lowered in facilitating loading or unloading of the conveyor, or the performance of operations on the commodities carried thereby. To accomplish this end, there is arranged above the beam 10 one or more stationary cylinders 32, in each of which there is slidably mounted a fluid-actuated piston 33. The piston is provided with an externally and downwardly extending piston rod 34, the lower end of which carries a vertically movable frame 35, the lower ends of the latter being provided with a pair of cam bars 36 of runner-like configuration.

When the piston 33 is forced downwardly in the cylinder 32, under valve or other suitably operated manual controls, the cam bars 36 are lowered to a position in which their upwardly deflected ends will be disposed in alignment with the rollers 22 of the cross head 20, so that as the carrier is moved longitudinally along the track beam by the movement of the chain 16, the contacting of the rollers 22 with the cam bars will cause the cross head 20 of each carrier to be depressed against the bias of the spring 25, so that the commodity hook will be lowered to the position disclosed at the right of Fig. 1. When the hook is so lowered, it will be seen that commodities may be readily placed thereon, removed or subjected to manufacturing or processing operations. After the carriers have been moved to a position so that the rollers 22 thereof are freed from engagement with the cam bars, the hooks are automatically restored to their normal elevated positions. It will be understood that the chain, cable or other motivating element 16 may be either continuously or intermittently driven, depending upon the nature of the operations to be performed on the commodities handled by the conveyor. Through the operation of the cylinder 32 and its piston 33, the cam bars 36 may be maintained in an elevated or inactive position, so that they will not depress the cross head 20 when the latter is in registration therewith. Thus, the bars 36 may be rendered active or inactive at will of the operator.

The invention is, of course, subject to certain mechanical variation or modification without departing from its essential operating principles. For example, as shown in Fig. 3, it may be desirable in certain conveyor installations to produce elevation of the hooks 31 at loading, unloading or processing stations rather than to depress the same as in the previously described form of my invention. To automatically elevate the hooks, the positions of the cam bars, shown at 36a, are advanced with respect to the positions disclosed in Fig. 1. Through this arrangement, the hooks are automatically elevated when such an operation is desired.

In the form of the invention disclosed in Fig. 4, the cam bars 36b may be pivotally mounted at one end, as indicated at 37 on supports 38 joined with the beam 10, the outer or free end of the bars 36b being pivotally connected as at 39 with rods 40 actuated by the cylinders 32. Similar guide supports for the cam bars 36b are shown at 38a. When the bars 36b occupy the full line position disclosed in Fig. 4, the same are actively located to depress the load carrier when the same passes thereby, and when said bars occupy the dotted line position of Fig. 4, the same will be inactively positioned to avoid depressing the load carrier.

Figure 5:
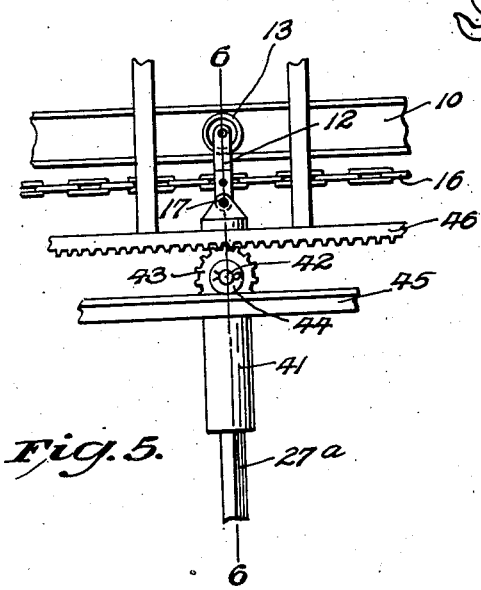
Fig. 5 is a fragmentary side elevational view of a conveyor having a gear actuated load-supporting carrier.
Figure 6:
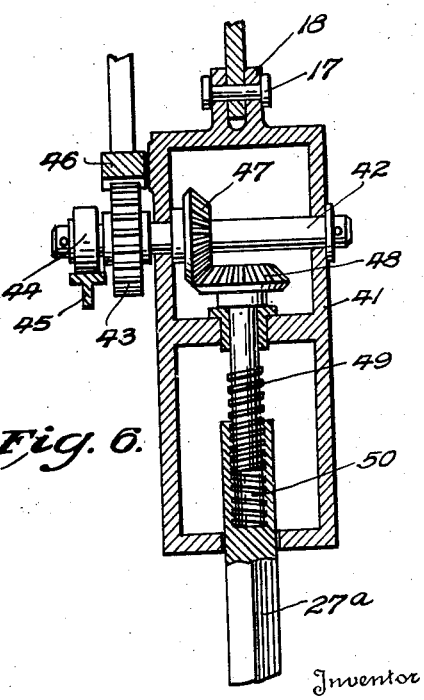
Fig. 6 is a vertical transverse sectional view on the line 6—6 of Fig. 5.

Another variation of the invention has been disclosed in Figs. 5 and 6, wherein each of the load carriers comprises a cylinder 41 having rotatably supported in the top thereof a shaft 42. This shaft projects exteriorly of the cylinder 41 and has fixed to one of its ends a gear 43 and a roller 44 which engages with a stationary T rail 45. As the cylinder is advanced longitudinally by the chain 16 along the track beam 10, the gear 43 is brought into meshing engagement with a rack bar 46, the latter being adjustably suspended from a cylinder such as that shown at 32 in the preceding forms of my invention. Through its engagement with the rack bar, the gear 43 rotates the shaft 42. Within the cylinder 41, the shaft 42 carries a bevel gear 47, which is adapted to mesh with a similar gear 48 provided on the upper end of a screw shaft 49 vertically journaled in the cylinder 41. The external threads of the shaft 49 are received within an internally threaded socket 50 provided in the upper end of a load-carrying rod 27a, the latter being substantially square in transverse cross section and being slidably received in a similarly formed opening provided in the lower end of the cylinder 41.

After the rod 27a has been retained in its lower position for a predetermined interval of travel, the gear 43 moves out of meshing engagement with the teeth of the rack bar 46 and into meshing engagement with rack teeth, not shown, provided on the rail 45, thus reversing the direction of rotation of the shaft 49 and raising the rod 27a, and the load carried thereby, to normal positions.

It will be seen that through this arrangement, when the gear 43 engages with the rack bar 46, the consequent rotation of the shafts 42 and 49 will produce lowering movement of the rod 27a, thus lowering the commodities supported on the lower end of said rod. Similarly, when the gear 43 engages the rack teeth on the rail 45, the loads are raised to their normally elevated positions.

Other variations, of course, will be apparent to those skilled in the art, and therefore I reserve the right to employ all such constructions that may be said to fall fairly within the scope of the following claims.

1. Conveyor mechanism comprising a stationary trackway, a plurality of spaced load-carrying devices suspended from and movable longitudinally of said trackway, each of said devices embodying a rollered trolley movable longitudinally along said trackway, a cylinder pivotally connected at its upper end with the lower end of said trolley, a cross head movably mounted in said cylinder, load-holding appliances suspended from said cross head, spring means positioned in said cylinder for maintaining said cross head in a normal position of operation, and a relatively stationary cam member engageable with said cross head to impart automatically vertical movement thereto from its normal position and against the influence of said spring means at a predetermined position of travel of said devices along said trackway.

2. Overhead conveyor mechanism comprising a stationary trackway, a plurality of spaced load-carrying devices movable longitudinally of and suspended from said trackway, each of said devices embodying a rollered trolley supported on and guided by said trackway, flexible power-transmitting means connected with said devices to move the same in unison along said trackway, a cylinder pivotally connected at its upper end with the lower end of each trolley, a cross head slidably supported for vertical movement in said cylinder, said cross head having aligned stud shafts projecting exteriorly of said cylinder through slots provided in the side walls thereof, rollers mounted on said stud shafts, spring means positioned in said cylinder for maintaining said cross head in a normal position therein, a load carrying rod depending from said cross head, means carried by said rod for limiting the movement of said cross head in one direction in response to the action of said spring means, a load holding appliance carried by the lower end of said rod, and cam rails engageable with the rollers on said stud shafts at a predetermined position along said trackway to move automatically said cross head and the rod suspended therefrom vertically of said cylinder and against the resistance of said spring means.

3. Conveyor mechanism as defined in claim 2, in combination with means for moving said cam rails between operative and inoperative positions of roller engagement and actuation.

4. Conveyor mechanism comprising a stationary trackway, a plurality of spaced load-carrying devices suspended from and movable longitudinally of said trackway, each of said devices embodying a rollered trolley mounted for movement longitudinally on said trackway, a cylinder connected at its upper end with the lower end of said trolley, a cross head movably mounted in said cylinder, said cross head being formed with aligned axial extensions projecting through vertical slots provided in said cylinder, roller devices rotatably mounted on said axial extensions exteriorly of said cylinder, load-holding appliances suspended from said cross head and projecting below said cylinder, spring means positioned in said cylinder for maintaining said cross head and said appliances in a normally elevated position of operation, an appliance-depressing frame having cam-shaped rails mounted adjacent to the sides of said trackway, and means for moving said frame from an elevated to a lowered position in which the cam rails thereof are disposed for engagement with the roller devices of said cross head, whereby to produce a depression of said cross head against the resistance of said spring means and the lowering of the appliances connected therewith during engagement of said roller devices with said cam rails.

5. Overhead conveyor mechanism as defined in claim 4 and wherein the cross head-containing cylinder is pivotally connected at its upper end with said trolley.

6. Overhead conveyor mechanism as specified in claim 4 in combination with fluid-actuated means for raising and lowering the cam rail frame between active and inactive positions of engagement with the roller devices of said cross head.

NORMAN M. SULLIVAN.

REFERENCES CITED

The following references are of record in the file of this patent:

UNITED STATES PATENTS

| Number | Name | Date |
|---|---|---|
| 1,255,083 | Dovoran | Jan. 29, 1918 |
| 1,132,713 | Francisco | Mar. 23, 1915 |

FOREIGN PATENTS

| Number | Country | Date |
|---|---|---|
| 248,168 | Italy | April 7, 1926 |